United States Patent

[11] 3,630,042

[72] Inventor Robert E. Petsinger
 Upper St. Clair, Pa.
[21] Appl. No. 797,461
[22] Filed Feb. 7, 1969
[45] Patented Dec. 28, 1971
[73] Assignee Ling Services
 Pittsburgh, Pa.

[54] METHOD AND SYSTEM FOR DESALINIZATION OF WATER
 5 Claims, 1 Drawing Fig.
[52] U.S. Cl. ....................................................... 62/58
[51] Int. Cl. ....................................................... B01d 9/04
[50] Field of Search ............................................ 62/58, 123, 124

[56] References Cited
UNITED STATES PATENTS

| | | | |
|---|---|---|---|
| 1,006,823 | 12/1909 | Block | 23/302 |
| 3,017,751 | 12/1962 | Hawkins | 65/58 |
| 3,160,572 | 12/1964 | Rarden | 202/182 |
| 3,183,666 | 5/1965 | Jackson | 60/38 |
| 3,285,024 | 11/1966 | Dunn | 62/58 |
| 3,385,074 | 5/1968 | Aronson | 62/58 |
| 3,404,536 | 10/1968 | Aronson | 62/58 |
| 3,137,554 | 6/1964 | Guleland | 62/58 |
| 3,253,419 | 5/1966 | Thomas | 62/58 |
| 3,344,616 | 10/1967 | Owen | 62/58 |
| 3,204,419 | 9/1965 | Rose | 62/58 |

Primary Examiner—Norman Yudkoff
Assistant Examiner—S. Silverberg
Attorney—Brufsky, Staas, Breiner and Halsey ABSTRACT: In a desalinization system for water, a method and system are provided employing liquified natural gas as a source of refrigeration and as a fuel for various power and heat generation functions. In each of a series of stages, the input salt water mixture is purified by freezing and the still brine liquid drawn off, with the frozen water then melted and recovered. The recovered water is advanced through successive stages for similar processing from the last stage of which purified water is obtained.

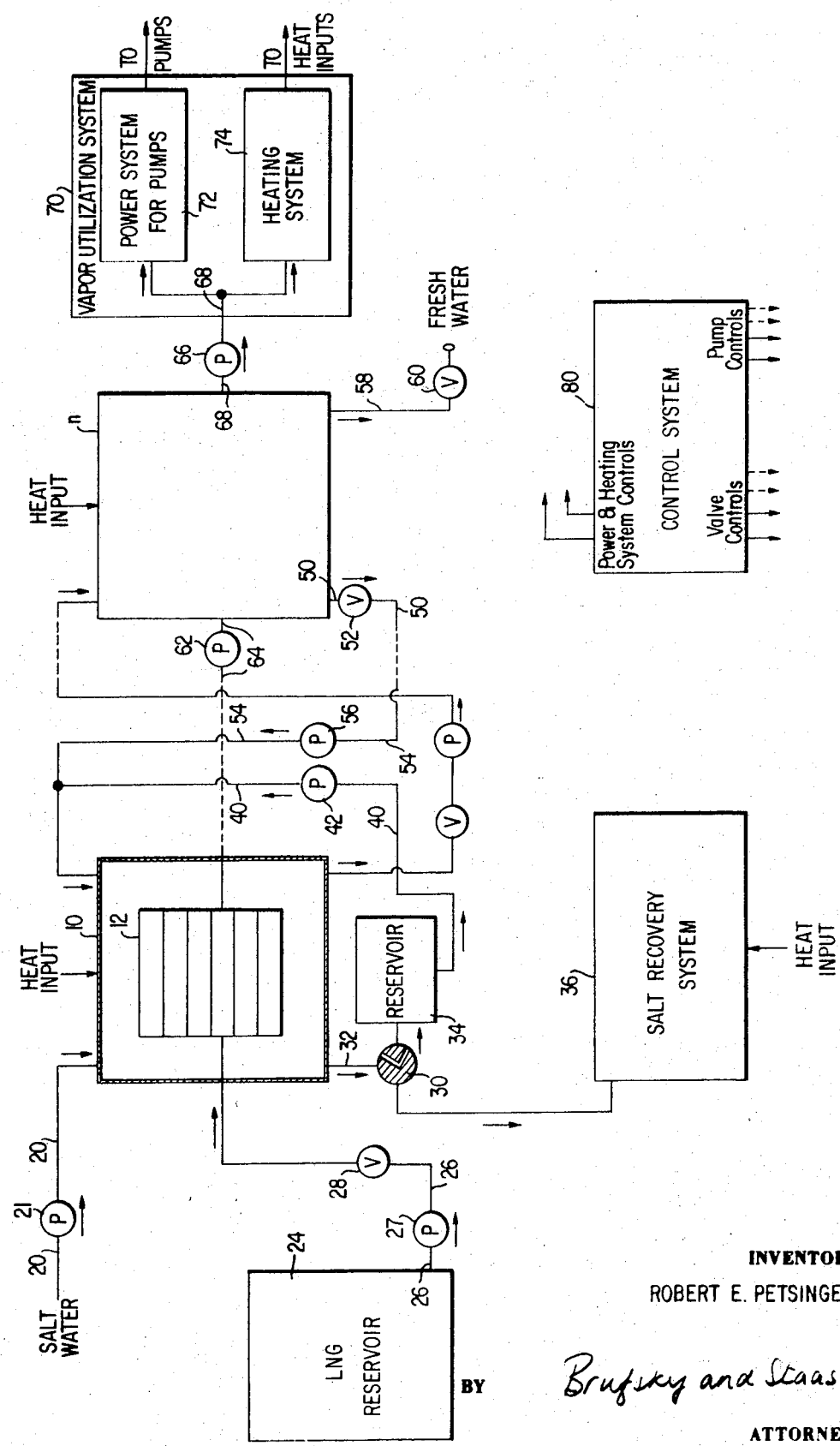

3,630,042

METHOD AND SYSTEM FOR DESALINIZATION OF WATER

BACKGROUND OF THE INVENTION

1. Field of the Invention

This invention relates to a method and a system for desalinization of water and, more particularly, to such a method and system employing liquified natural gas (LNG) as a refrigerant and a fuel for power and heat generation.

2. State of the Prior Art

There have been provided heretofore in the prior art various methods and systems for effecting the desalinization of water. Many such systems are extremely complex and costly in the construction and operation thereof, and, as a result, are prohibitively expensive for use in the commercial desalinization of water. Further, many systems of the prior art cannot be constructed on a scale whereby they are portable or easily transported to desired locations for temporary use, or for use where only a small demand is present for fresh water. In addition, the power requirements for prior art systems frequently confine the use of such prior art desalinization systems to a location where large sources of power are readily available. Fuels employed in such prior art systems are typically not only very expensive, but produce an exhaust contributing to air pollution.

SUMMARY OF THE INVENTION

The foregoing and other defects and disadvantages of prior art desalinization methods and systems are overcome by that of the invention.

In accordance with the invention, liquified natural gas (LNG) is employed as both a source of refrigeration and as a fuel for power and heat generation systems in the desalinization of water. LNG is a liquified combination of gases, primarily including methane, typically in the amount of 90–93 percent of the total gas mixture. LNG also contains small amounts of nitrogen, ethane, carbon dioxide, propane, and other like hydrocarbons. LNG has a boiling point at one atmosphere pressure of $-259°$ F., and requires approximately 400 BTU's per liquid pound, for vaporization thereof at ambient conditions.

LNG, in the liquid state, occupies approximately 1/632 of the volume of the material in a gaseous state at normal ambient conditions. The gaseous LNG, when combined with air, provides a combustible mixture which is an ideal source of energy. The exhaust products from combustion of LNG are essentially smokeless and thus effectively produce no pollution problems in the atmosphere.

In accordance with the invention, salt water is desalinized by successive stages of treatment. In each stage, the incoming, higher salt content water, is frozen on heat exchangers through which the liquid LNG is pumped. Water of a lower salt concentration freezes on the plates and thereby is separated from the remaining liquid, which now is of substantially higher salt content. The resultant brine is then removed, the frozen water melted and pumped to the next successive stage. The brine from each stage may be recycled to a preceding stage for further treatment with new water received in that stage.

Since the salt concentration is thus highest at the initial stages and thus the freezing temperature of the liquid received in that stage is lower than that in the succeeding stages, the LNG is initially introduced into the first stage and, preferably, through the succeeding stages in succession. The LNG recovered from the last stage, which may now be vaporized, is conveniently employed as a fuel by vapor utilization systems, such as power systems for driving the pumps which control the flow of water and LNG through the system, and as a fuel for a heating system to effect the melting of the ice recovered from the salt water concentrate in each stage.

BRIEF DESCRIPTION OF THE DRAWINGS

The single FIGURE of the drawings comprises a block diagram of a desalinization system in accordance with the invention; also serving to illustrate the method of the invention.

DETAILED DESCRIPTION OF THE INVENTION

With reference to the single FIGURE of drawings, a system in accordance with the invention for desalinization of water may include a plurality of water treatment stages 10,... $n$ through which the water proceeds in a stepwise process. In each stage, the water is treated and purified. The number of stages required is a function of the degree of desalinzation necessary for a given application. In a practical commercial embodiment, a reasonable number of such stages may effect purification of the water to contain less than 400 parts per million of salt content.

Each of the stages may be of substantially identical construction, and thus there is schematically illustrated with respect to the first stage 10, only, the provision of heat exchange surfaces 12.

Salt water from a suitable source is supplied through the conduit 20 including a suitable pump 21 to the new, or salt water input of the first stage 10. A specially constructed tank or reservoir 24 contains a supply of LNG in which the LNG is stored for utilization in the distillation system. A conduit 25 including a pump 27 supplies the LNG to the heat exchange surface 12 of the first stage 10. As noted, in the liquid stage, LNG is at a very low temperature. A portion of the salt water received within the first stage 10 is thus caused to freeze on the heat exchange surfaces. The frozen water is of a lower salt concentration than the remaining liquid portion thereof, which now comprises a brine of a higher salt concentration. The amount of LNG required to effect this selective freezing may be controlled in accordance with the fluid capacity of the stage 10 and the available surface of heat exchange 12 by a valve 28 also included in the conduit 26.

The still, concentrated brine liquid, may then be drawn off from the stage 10, leaving only the frozen water on the heat exchanger 12. For this purpose, a control valve 30 is provided which is adjustable to connect to the outlet conduit 32 of the stage, or distillation freezing chamber 10, for permitting the liquid brine to be received selectively in a reservoir 34 or in a salt recovery system 36. The function of systems 34 and 36 will be described hereafter.

In a manner to be described, a heat input is provided to the chamber 10 and particularly to the heat exchange surfaces 12 for melting the frozen water from these heat exchangers. The water thus recovered, and purified from that originally introduced into the chamber 10, is communicated through a conduit 44 which includes a control valve 46 and a pump 48 to the next stage, i.e., the next successive distillation freezing chamber. In each such successive stage of the series of chambers, the incoming water is treated in the process described with respect to stage 10. Preferably, the brine recovered from each stage is recycled to the next preceding stage for reprocessing with new water received in that stage. To illustrate such a recycling connection, a conduit 50 including a valve 52 is connected to the last stage $n$ and with a preceding stage (not shown). Illustratively, however, the conduit 50 may correspond or be connected to a further conduit 54 including a pump 56 which recycles the recovered brine from the stage $n$ to the next preceding stage, which in this case, in the initial stage 10.

As discussed previously the brine from the first stage 10 may be collected in a reservoir 34. Following melting of the ice on the exchangers 12 of stage 10 and removal of that melted ice, the valve 46 may be opened and the pump 42 actuated to recycle the brine from the reservoir 34 to the chamber 10, along with new water received through conduit 20 for a subsequent processing step in the chamber 10.

In time, the salt concentration of the brine renders recovery inefficient, and thus the valve 30 may be positioned to advance the brine to the salt recovery system 36. The system 36 includes a heat input which serves to evaporate the liquid in the brine received in the system 36 to permit recovery of the solids therein.

The purified fresh water output is obtained from the last stage n and, as illustrated, from a conduit 58 containing a valve 60. In relation to the discussion of the stage 10, the valve 60 is opened to receive the fresh water as it is melted from the heat exchange surface provided with the stage 10.

Since the salt water received in the first chamber of the system has the highest salt concentration, it also has the lowest freezing point. Thus, the LNG is initially introduced to the heat exchanger 12 of the first stage 10 and from that heat exchanger of each successive stage of the plurality of stages. As illustrated, for the last stage n, the pump 62 pumps the LNG is from a preceding stage through conduit 64 to the last stage n. Depending on the number of stages and the amount of refrigeration required in each stage, the LNG may be either a low temperature vapor or still in the liquid state upon introduction to the last stage or even the last few stages. Efficiency of operation will determine the vapor or liquid state of the LNG desired as to these stages. The LNG recovered from a heat exchanger of the last stage n typically is now vaporized but, in some instances, may still be a liquid. A pump 66 is provided for pumping the LNG through a conduit 68 to a vapor utilization system 70. In the system 70, the LNG is utilized in any suitable energy consuming process and particularly in a power system 72 for driving the pumps above described, and in a heating system 74 for providing heat inputs to the heat exchangers of each stage and to the salt recovery system 36. Typical power and heating systems may employ turbine driven or internal combustion engines utilizing the LNG vapor as a fuel. Alternatively, the heating system may employ the LNG vapor as a fuel for heating a different heat transfer medium, such as water which may be continuously recycled to the heat utilizing apparatus of the system as above described.

A control system 80 is provided for effecting coordinated actuation of the valves and the pumps in the system in accordance with the foregoing description for the input, recycling, and advancing of the salt water to be purified through the plurality of stages, in succession, and for regulating the operation of the vapor utilization system 70.

In summary, the desalinization system of the invention employs LNG as both a source of refrigeration and a source of fuel. The dual use of LNG enables construction of a compact desalinization system. Since LNG, the liquid stage, occupies only a fraction of its gaseous stage volume while affording a high B.t.u. valve, a portable desalinization system may readily be realized. The dual use of LNG also results in low cost but highly efficient systems. Further, the exhaust products from combustion of LNG when employed as a fuel are essentially smokeless and substantially eliminate pollution effects. It will be appreciated that the invention may employ any combustible cryogenic gas including not only LNG, as defined above, but also, for example methane, hydrogen, ethane, and ethylene. Thus, as employed in the specification and claims hereof, liquified natural gas (LNG) is intended to include any combustible cryogenic gas.

What is claimed is:

1. In a water desalinization system which employs means for freezing a portion of a saline water being processed, and collecting the frozen portion having a reduced salt concentration, the improvement comprising:
    a source of vaporizable and combustible cryogenic refrigerant, said vaporizable and combustible cryogenic refrigerant comprising liquified natural gas;
    heat exchange means employing said refrigerant for reducing the temperature of the saline water to a point where freezing occurs, the frozen portion being of lower salt concentration than the unfrozen portion;
    said heat exchange means being constructed to preclude mixing of the refrigerant with the saline water and including heat transfer surfaces which receive said frozen portion;
    means for supplying cryongenic refrigerant to said heat exchange means;
    means for recovering the unfrozen portion of the saline water having increased salt concentration and means for recovering said salt; and
    means for recovering said refrigerant and further utilizing it as a fuel to evaporate water from the recovered increased salt concentration water to effect further concentration.

2. The system of claim 1 including power generating means for further utilizing the recovered liquefied natural gas and thereby effect advancement of water and liquefied natural gas through said system.

3. A method for the desalinization of water comprising:
    providing a source of liquified natural gas as a cryogenic refrigerant;
    advancing saline water in heat exchange relationship to lower temperature liquefied natural gas for reducing the temperature of the saline water to a level where a portion of said saline water freezes;
    vaporizing a portion of the liquified natural gas to effect said temperature reduction, said heat exchange being performed in a heat exchanger constructed to preclude mixing of saline water with liquefied natural gas;
    freezing a portion of the saline water on said heat exchange surfaces, said frozen portion having a lower salt concentration than the unfrozen portion;
    recovering the frozen portion to provide purified water; and
    utilizing liquefied natural gas as a source of fuel to generate heat for melting the ice to effect the selected recovery.

4. The method as recited in claim 3 comprising:
    initially utilizing the liquified natural gas as a source of refrigeration, and
    utilizing the liquified natural gas subsequently to use for refrigeration as a fuel for melting the ice.

5. The method as recited in claim 4 comprising:
    freezing the water and recovering purified water in each of a series of successive steps for recovering purified water of successively lower salt concentration in the successive steps,
    utilizing the purified water recovered in a given step in the next successive step, and
    recovering the liquefied natural gas utilized as a source of refrigeration for freezing in a given step as the source of refrigeration for freezing in each next successive step, and further
    utilizing the liquefied natural gas recovered from the last step as a fuel for heat generation for melting the ice formed in each step.

* * * * *